United States Patent [19]

Houlihan

[11] 3,917,634
[45] Nov. 4, 1975

[54] 1-(2,6-DIMETHYL-2-OCTEN-8-YL)-2-SUBSTITUTED OR UNSUBSTITUTED PHENYLIMIDAZOLES

[75] Inventor: William J. Houlihan, Mountain Lakes, N.J.

[73] Assignee: Sandoz, Inc., E. Hanover, N.J.

[22] Filed: Nov. 9, 1973

[21] Appl. No.: 414,366

[52] U.S. Cl. .......... 260/309; 260/456 P; 260/654 R; 424/273
[51] Int. Cl.$^2$ ..................................... C07D 233/58
[58] Field of Search ..................................... 260/309

[56] References Cited
UNITED STATES PATENTS

| 3,073,841 | 1/1963 | Schindler | 260/309 |
| 3,479,367 | 11/1969 | Miller | 260/309 |

OTHER PUBLICATIONS

Imidazole & Derivatives, Part I, Hofmann, (1953), p. 49.

*Primary Examiner*—Sherman D. Winters
*Attorney, Agent, or Firm*—Gerald D. Sharkin; Robert S. Honor

[57] ABSTRACT

1-(2,6-dimethyl-2-octen-8-yl)-2-substituted or unsubstituted phenylimidazoles, e.g. 1-(2,6-dimethyl-2-octen-8-yl)-2-phenylimidazole, are prepared by treating a 2-substituted or unsubstituted phenylimidazole with a citronellyl halide or aryl sulfonate in the presence of an acid binding agent, and are useful as anti-obesity agents.

6 Claims, No Drawings

1-(2,6-DIMETHYL-2-OCTEN-8-YL)-2-SUBSTITUTED OR UNSUBSTITUTED PHENYLIMIDAZOLES

This invention relates to 1-(2,6-dimethyl-2-octen-8-yl) phenylimidazoles which exhibit anti-obesity activity. In particular it relates to 1-(2,6-dimethyl-2-octen-8-yl)-2-substituted or unsubstituted phenylimidazoles, their preparation, pharmaceutically acceptable acid addition salts and intermediates thereof.

The compounds of this invention may be represented by the following structural formula:

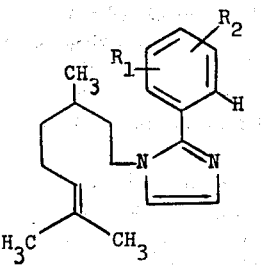

(I)

Where
R₁ and R₂ each independently represent hydrogen, halo having an atomic weight of about 19 to 36, straight chain lower alkyl, i.e., alkyl having one to four carbon atoms, e.g. methyl, ethyl, propyl and the like, lower alkoxy, i.e., alkoxy having one to four carbon atoms, e.g. methoxy ethoxy, isopropoxy and the like, or trifluoromethyl, or
R₁ and R₂ on adjacent carbon atoms together represent methylenedioxy
provided that when R₁ and R₂ are both trifluoromethyl they are on other than adjacent carbon atoms.

The compounds of formula (I) may be prepared according to the following reaction scheme A:

where
R₁ and R₂ are as defined above, and
x is halo having an atomic weight of about 35 to 127, or

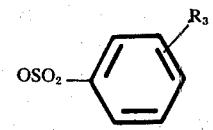

wherein R₃ is hydrogen, chlorine or methyl.

The compounds of formula (I) are prepared by treating a compound of the formula (II) with a compound of the formula (III) in the presence of an acid binding agent in an inert organic solvent. The acid binding agent employed can be any of the conventional acid binding agents such as the alkaline earth metal carbonates, e.g. calcium carbonate or magnesium carbonate, or the alkali metal carbonates and bicarbonates such as potassium carbonate, sodium carbonate, lithium carbonate, potassium bicarbonate, sodium bicarbonate and the like, preferably potassium carbonate. Although the particular solvent used is not critical, the preferred solvents are the aromatic hydrocarbons such as benzene, toluene and the like, alkanes having six to 12 carbon atoms, e.g. hexane, heptane and the like, or the lower alkanols such as methanol, ethanol and isopropanol, the latter being especially preferred. The temperature of the reaction is not critical but it is preferred that the reaction be carried out at a temperature between about 50° to 150°C., preferably the reflux temperature of the solvent. The reaction may be run from about 24 to 84 hours, preferably from about 8 to 48 hours. The product is recovered using conventional techniques, e.g. distillation or crystallization or when necessary, column chromotography followed by distillation or crystallization.

The compounds of formula (I) may also be prepared according to the following reaction scheme B:

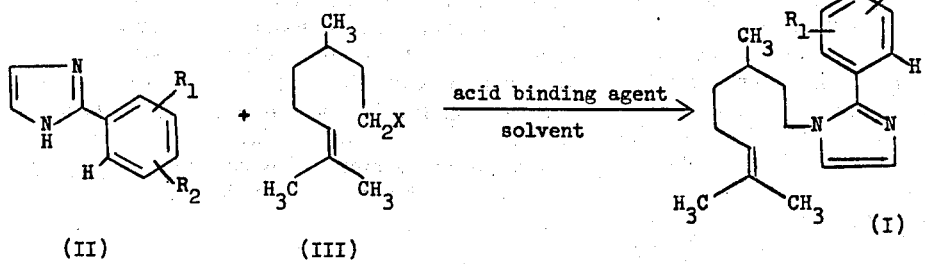

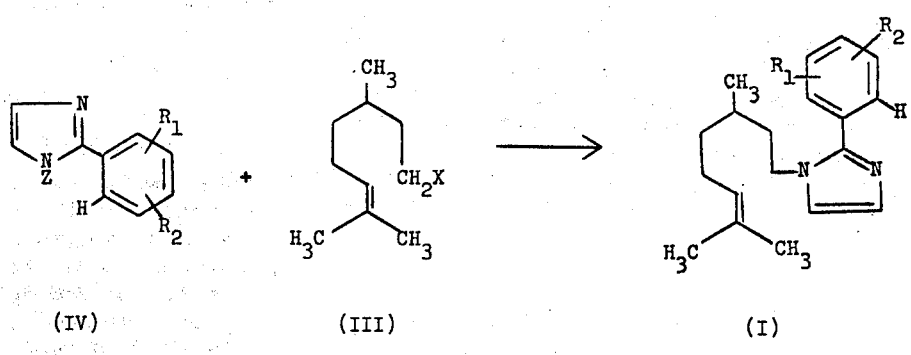

where
R₁, R₂ and X are as defined above and
Z is sodium, potassium or lithium.

The compounds of formula (I) are also prepared by treating a compound of the formula (IV) with a compound of the formula (III) in the presence of an inert organic solvent. The particular solvent used is critical and the preferred solvents are the aromatic hydrocarbons, e.g., benzene, toluene and the like, the ethers such as dioxane, tetrahydrofuran and the like dimethylacetamide or dimethylformamide, the latter being especially preferred. The temperature of the reaction is not critical, but it is preferred that the reaction be carried out at a temperature between about 20° to 50°C., preferably from about 20° to 30°C. The reaction may be run from about 6 to 48 hours, preferably from about 20 to 28 hours. The product is recovered using conventional techniques, e.g., distillation or crystallization or when necessary, column chromatography followed by distillation or crystallization.

The compounds of formula (IV) are prepared by conventional techniques, from compounds of the formula (II), for example by treating a compound of the formula (II) with an alkali metal or an alkali metal hydride such as sodium, potassium, lithium or sodium hydride, potassium hydride, or lithium hydride, preferably sodium hydride, employing the same reaction conditions described in reaction scheme B above.

Many of the compounds of formula (II), (III) and (IV) are known and may be prepared by methods described in the literature. The compounds of formula (II), (III) and (IV) not specifically disclosed may be prepared by analogous methods from known starting materials.

It will be understood that the compounds of formula (I) may exist in the form of optically active isomers, which can be separated and recovered by conventional techniques, and such isomeric forms are also included within the scope of this invention.

The compounds of formula (I) are useful because they possess pharmacological activity in animals, particularly as anti-obesity agents, as indicated by their activity in Male Wistar rats dosed orally with 11 mg/kg of active material after at least 20 hours of fasting. One hour after receiving the drug the animal is sacrificed and the upper small intestine is removed and washed with glucose-saline. A 5cm section of the intestine is everted so that the mucosal surface is on the outside. One end of the segment is tied off and the center of the sac so formed, is filled with oxygen saturated Kreb's bicarbonate buffer. The other end is then closed to form a sac and the sac is incubated in 10 ml. of oxygen saturated biocarbonate buffer for 60 minutes at 37°C. Both the outside and inside solutions contain initially 0.3% of glucose. At the end of the incubation time the glucose content of the outer (mucosal) and the inner (serosal) solution is determined using the standard Autoanalyzer procedure. Similar preparations are prepared simultaneously from animals receiving the vehicle only to serve as controls. The percent inhibition of glucose transport caused by the drug is calculated from the formula $$\% I = 100 - \left( \frac{ST - MT}{SC - MC} \times 100 \right)$$

where
I equals inhibition
S equals glucose concentration (mg%) of serosal fluid at the end of an experiment
M equals glucose concentration (mg%) of mucosal fluid at the end of an experiment
C equals control animal
T equals drug treated animal.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixirs and parenterally as solutions, suspensions dispersions, emulsions, and the like, e.g., a sterile injectable aqueous solution. The dosage will vary depending upon the mode of administration utilized and the particular compound employed.

The compounds of formula (I) may be similarly administered in the form of their non-toxic pharmaceutically acceptable salts. Such salts possess the same order of activity as the free base, and are readily prepared by reacting the base with an appropriate acid and, accordingly, are included within the scope of this invention. Representative of such salts are the mineral acid salts, such as the hydrochloride, hydrobromide, sulfate, phosphate and the like and the organic acid salts such as the succinate, benzoate, acetate, p-toluenesulfonate, benzene-sulfonate and the like.

The anti-obesity effective dosage of compound (I) employed in the alleviation of obesity will vary depending on the particular compound employed and the severity of the condition being treated. However, in general, satisfacotry results are obtained when the compounds of formula (I) are orally administered at a daily dosage of from about 1 to about 100 milligrams per kilogram of animal body weight, preferably given in divided doses two to four times per day, or in sustained release form. For most large mammals, the total daily dosage is from about 75 milligrams to about 1,500 milligrams. Dosage forms suitable for internal use comprise from about 18.5 to about 750 milligrams of the active compound in intimate admixture with a solid or liquid pharmaceutically acceptable carrier or diluent.

A representative formulation suitable for oral administration two to four times a day for the treatment of obesity is a capsule prepared by standard encapsulating techniques which contains the following:

| Ingredients | Weight (mg) |
| --- | --- |
| (±)-1-(2,6-dimethyl-2-octen-8-yl)-2-phenylimidazole | 100 |
| inert solid diluent (starch, lactose, kaolin). | 200 |

EXAMPLE 1

(±)-1-(2,6-dimethyl-2-octen-8-yl)-2-phenylimidazole

To a solution of 10.0 g. (0.07 mole) of 2-phenylimidazole in 100 ml. and 100 ml. dry tetrahydrofuran under nitrogen atmosphere, there is added at room temperature 9.7 g. (0.07 mole) of potassium carbonate. The resulting mixture is heated at room temperature for about 30 hours, and there is then added 16.8 g. (0.07 mole) of (±)-8-bromo-2,6-dimethyl-2- octene in 50 ml. of dry tetrahydrofuran. The reaction is stirred overnight at room temperature, and the resulting residue is chromatographed on silica gel using methylene chloride as an eluant. Distillation of the chromochromotographic fractions gave (±)-1-(2,6-dimethyl-2-octen-8-yl)-2-phenylimidazole, b.p. 155°–160°C. at 0.75 mm/hg.

Following the above procedure and using in place of 2-phenylimidazole an equivalent amount of
  a. 2-(p-chlorophenyl)imidazole,
  b. 2-(p-tolyl)imidazole,
  c. 2-(p-anisyl)imidazole,
  d. 2-(m-trifluoromethylphenyl)imidazole,
  e. 2-(3,4-dichlorophenyl)imidazole, or
  f. 2-(3,4-methylenedioxyphenyl)imidazole
there is obtained
  a. (±)-1-(2,6-dimethyl-2-octen-8-yl)-2-(p-chlorophenyl)-imidazole,
  b. (±)-1-(2,6-dimethyl-2-octen-8-yl)-2-(p-tolyl)imidazole,
  c. (±)-1-(2,6-dimethyl-2-octen-8-yl)-2-(p-ainsyl)-imidazole,
  d. (±)-1-(2,6-dimethyl-2-octen-8-yl)-2-(m-trifluoromethylphenyl)-imidazole,
  e. (±)-1-(2,6-dimethyl-2-octen-8-yl)-2-(3,4-dichlorophenyl)-imidazole, or
  f. (±)-1-(2,6-dimethyl-2-octen-8-yl)-2-(3,4-methylenedioxyphenyl)-imidazole, respectively.

The (±)-1-(2,6-dimethyl-2-octen-8-yl)-2-phenylimidazole of this example is an effective anti-obesity agent when orally administered to an animal suffering from obesity at a dosage of 150 mg. four times per day.

EXAMPLE 2

(±)-1-(2,6-dimethyl-2-octen-8-yl)-2-phenylimidazole

To a solution of 10.0 g. (0.07 mole) of 2-phenylimidazole in 50 ml. of dry dimethylformamide and 100 ml. dry tetrahydrofuran under nitrogen atmosphere, there is added at room temperature 3.0 g. (0.7 mole) of a 57% sodium hydride/mineral oil suspension. The resulting mixture is stirred and heated to 50°C. for about 2 hours. After cooling to room temperature the resulting mixture is reacted with a solution of 16.8 g. (0.07 mole) (±)-8-bromo-2,6-dimethyl-2-octene in 50 ml. of dry tetrahydrofuran. The reaction is stirred overnight at room temperature and the resultant salts are filtered off. The filtrate is concentrated in vacuum and the remaining oily residue is chromatographed on silica gel using methylene chloride as an eluant. Distillation of the chromatography fraction gave (±)-1-(2,6-dimethyl-2-octen-8-yl)-2-phenylimidazole, b.p. 155°–160°C. at 0.75 mm.

Following the above procedure and using in place of 2-phenylimidazole an equivalent amount of
  a. 2-(p-chlorophenyl)imidazole,
  b. 2-(p-tolyl)imidazole,
  c. 2-(p-anisyl)imidazole,
  d. 2-(m-trifluoromethylphenyl)imidazole,
  e. 2-(3,4-dichlorophenyl)imidazole, or
  f. 2-(3,4-methylenedioxyphenyl)imidazole
there is obtained
  a. (±)-1-(2,6-dimethyl-2-octen-8-yl)-2-(p-chlorophenyl)-imidazole,
  b. (±)-1-(2,6-dimethyl-2-octen-8-yl)-2-(p-tolyl)-imidazole,
  c. (±)-1-(2,6-dimethyl-2-octen-8-yl)-2-(p-anisyl)-imidazole,
  d. (±)-1-(2,6-dimethyl-2-octen-8-yl)-2-(m-trifluoromethylphenyl)-imidazole,
  e. (±)-1-(2,6-dimethyl-2-octen-8-yl)-2-(3,4-dichlorophenyl)-imidazole, or
  f. (±)-1-(2,6-dimethyl-2-octen-8-yl)-2-(3,4-methylenedioxyphenyl)-imidazole, respectively.

What is claimed is:
1. A compound of the formula

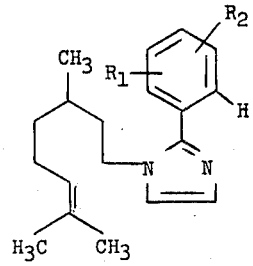

where
  $R_1$ and $R_2$ each independently represent hydrogen, halo having an atomic weight of about 19 to 36, straight chain lower alkyl having one to four carbon atoms, lower alkoxy having one to four carbon atoms, trifluoromethyl, or
  $R_1$ and $R_2$ on adjacent carbon atoms together represent methylenedioxy,
provided that when $R_1$ and $R_2$ are both trifluoromethyl they are on other than adjacent carbon atoms; or a pharmaceutically acceptable acid addition salt thereof.

2. A compound of claim 1 in free base form.

3. A compound according to claim 1 in which both $R_1$ and $R_2$ are hydrogen.

4. The compound of claim 1 which is (+)-1-(2,6-dimethyl-2-octen-8-yl)-2-phenylimidazole.

5. The compound of claim 1 which is (−)-1-(2,6-dimethyl-2-octen-8-yl)-2-phenylimidazole.

6. The compound of claim 1 which is (±)-1-(2,6-dimethyl-2-octen-8-yl)-2-phenylimidazole.

* * * * *